(12) United States Patent
Antonacci

(10) Patent No.: US 11,492,177 B2
(45) Date of Patent: *Nov. 8, 2022

(54) BAG WITH MULTI-LAYER SEAM STRUCTURE

(71) Applicant: ANCI, INC., Kennesaw, GA (US)

(72) Inventor: Paul Antonacci, Atlanta, GA (US)

(73) Assignee: ANCI, INC., Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,075

(22) Filed: Nov. 24, 2020

(65) Prior Publication Data

US 2021/0078768 A1 Mar. 18, 2021

Related U.S. Application Data

(63) Continuation of application No. 16/023,260, filed on Jun. 29, 2018, now Pat. No. 10,875,683.

(60) Provisional application No. 62/528,407, filed on Jul. 3, 2017, provisional application No. 62/528,371, filed on Jul. 3, 2017.

(51) Int. Cl.
| | | |
|---|---|---|
| *B65D 30/06* | (2006.01) | |
| *B29C 65/00* | (2006.01) | |
| *B65D 33/02* | (2006.01) | |
| *B29L 31/00* | (2006.01) | |
| *B29K 623/00* | (2006.01) | |

(52) U.S. Cl.
CPC ............ *B65D 29/04* (2013.01); *B29C 66/135* (2013.01); *B29C 66/304* (2013.01); *B29C 66/43* (2013.01); *B29C 66/729* (2013.01); *B65D 33/02* (2013.01); *B29K 2623/06* (2013.01); *B29K 2713/00* (2013.01); *B29L 2031/7129* (2013.01)

(58) Field of Classification Search
CPC ...... B65D 29/04; B65D 33/02; B29C 66/135; B29C 66/304; B29C 66/43; B29C 66/729; B29K 2623/06; B29K 2713/00; B29K 2031/7129; B29L 2031/7129
USPC .................................................. 383/107, 117
See application file for complete search history.

(56) References Cited

U.S. PATENT DOCUMENTS

| | | |
|---|---|---|
| 1,877,456 A | 9/1932 | Gurwick |
| 1,962,071 A | 6/1934 | Greene |
| 2,103,092 A | 12/1937 | Robinson |
| 2,121,053 A | 6/1938 | Robinson |
| 2,422,725 A | 6/1947 | Gilfillan |

(Continued)

OTHER PUBLICATIONS

PCT, European Patent Office (ISA/EP), Invitation to Pay Additional Fees, International Application No. PCT/US2018/040261, 15 pages, Sep. 14, 2018.

(Continued)

*Primary Examiner* — Jes F Pascua
(74) *Attorney, Agent, or Firm* — Thompson Hine LLP

(57) ABSTRACT

The present invention is directed to a side-sealed open mesh fabric bag having one or more multi-layer seam structures. At least one side seam of the bag comprises a plurality of folded layers of the bag's fabric bonded together within a seam structure by a plurality of seal portions. At least one of those seal portions is a sacrificial seal configured to at least partially give from the seam structure, whilst one or more other seal portions of the seam structure remain intact. The sacrificial seal provides the bag with volumetric flexibility, whilst the remaining seam structure provides an improved seam strength.

6 Claims, 9 Drawing Sheets

(56) References Cited

U.S. PATENT DOCUMENTS

| | | | |
|---|---|---|---|
| 3,578,239 A | | 5/1971 | Perlman |
| 5,385,766 A | * | 1/1995 | Ferre .................. B65D 29/04 428/36.1 |
| 6,371,645 B1 | | 4/2002 | Rusert et al. |
| 6,974,406 B2 | | 12/2005 | Antonacci |
| 10,875,683 B2 | * | 12/2020 | Antonacci ............. B65D 33/02 |
| 2002/0102033 A1 | | 8/2002 | Antonacci |
| 2006/0133701 A1 | | 6/2006 | Daniels |
| 2008/0187256 A1 | | 8/2008 | Hishinuma |
| 2009/0180717 A1 | * | 7/2009 | Ferrer ................... B65D 29/04 383/117 |
| 2013/0115414 A1 | | 5/2013 | Ekenhorst |
| 2013/0202229 A1 | | 8/2013 | Broering et al. |

OTHER PUBLICATIONS

PCT, European Patent Office (ISA/EP), International Search Report and Written Opinion of the International Searching Authority, International Application No. PCT/US2018/040261, 19 pages, Nov. 21, 2018.

U.S. Patent and Trademark Office, Non-Final Office Action, U.S. Appl. No. 16/023,260, 10 pages (dated Feb. 20, 2020).

U.S. Patent and Trademark Office, Notice of Allowance, U.S. Appl. No. 16/023,260, 5 pages (dated Sep. 2, 2020).

* cited by examiner

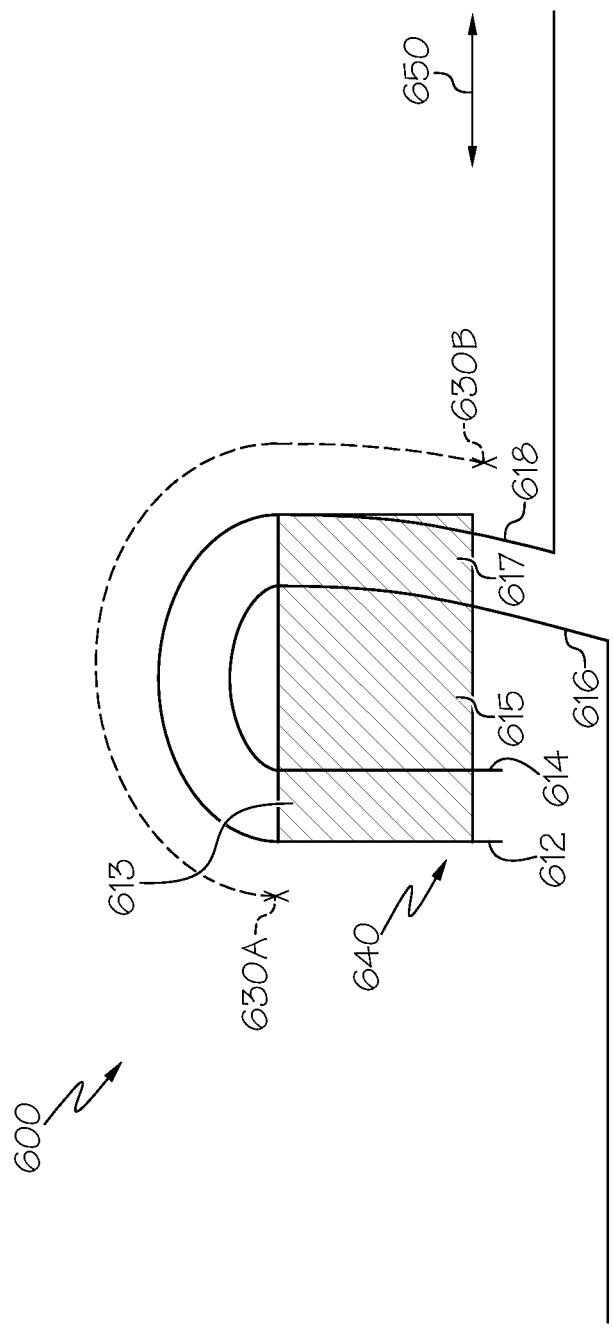

BAG WITH MULTI-LAYER SEAM STRUCTURE

PRIORITY CLAIM

The present application is a continuation of and claims priority to U.S. Non-Provisional patent application Ser. No. 16/023,260, filed on Jun. 29, 2018 and entitled "Bag with Multi-Layer Seam Structure", which claims priority to U.S. Provisional Patent Application No. 62/528,407 and U.S. Provisional Patent Application No. 62/528,371, each filed on Jul. 3, 2017 and entitled "Bag with Multi-Layer Seam Structure", the contents of each of which are incorporated herein by reference as if reproduced in their entirety.

TECHNICAL FIELD

The present invention relates generally to bags suitable for packaging produce, goods and other articles, although not limited thereto. More specifically, the present invention relates to a side-sealed open mesh fabric bag having a multi-layer seam structure that exhibits a strength comparable to the original strength of the stock material from which the bag is fabricated.

BACKGROUND

Bags made of open mesh fabrics are manufactured for various packaging applications, including, for example, packaging of produce. Seam strength is of paramount consideration in the manufacture of side sealed bags made with an open mesh fabric. U.S. Pat. No. 6,371,645, issued to Russert et al., and U.S. Pat. No. 6,974,406, issued to Antonacci, each describe side sealed bags with an adhesive film strip provided between mesh fabric layers to increase a strength of a corresponding seam structure. While these bags work very well and are in widespread commercial use, they require the pre-application of an adhesive film strip thereto, which adds to the manufacturing cost of the bag. Additionally, even with such film strips, the seam strength of these types of bags is approximately 50% or less of the original strength of the mesh fabric. As such, needs exist from cost, performance, and functionality standpoints to improve the seams of side sealed mesh bags.

SUMMARY

The present invention addresses these and other issues associated with the prior art by providing a bag with a seam structure having a seam strength comparable to an original strength of an open mesh fabric from which the bag is fabricated, and a method of production thereof. That seam strength is realized without incurring the additional manufacturing costs associated with the pre-application of an adhesive material (e.g., a film strip). In one embodiment, a seam structure for a bag according to the present invention is implemented using a heat-sealed multi-layer "J" seam, which does not require, and thus does not include, an adhesive material applied thereto for purposes of bonding the multiple layers of open mesh fabric within the "J" seam.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

FIG. 6 depicts an example of a seam structure prior to seam strength testing;

DETAILED DESCRIPTION

For simplicity and illustrative purposes, the principles of the present invention are described by referring to various exemplary embodiments thereof, and which embodiments may be depicted in FIGS. 1-8. The present invention is not limited to the particular examples, embodiments or methods described herein or otherwise depicted in the Figures, as these may vary. Additionally, the terminology used herein is used for the purpose of describing particular embodiments only, and is not intended to limit the scope of the present invention. Specific methods and materials are described, although other methods and materials similar or equivalent to those described herein may be used in the practice of the present invention. Moreover, although certain methods may be described with reference to certain steps that are presented herein in a certain order, in many instances, these steps may be performed in any order as would be appreciated by one of ordinary skill in the art, and thus the methods are not limited to the particular arrangement of steps disclosed herein.

Figure 1:
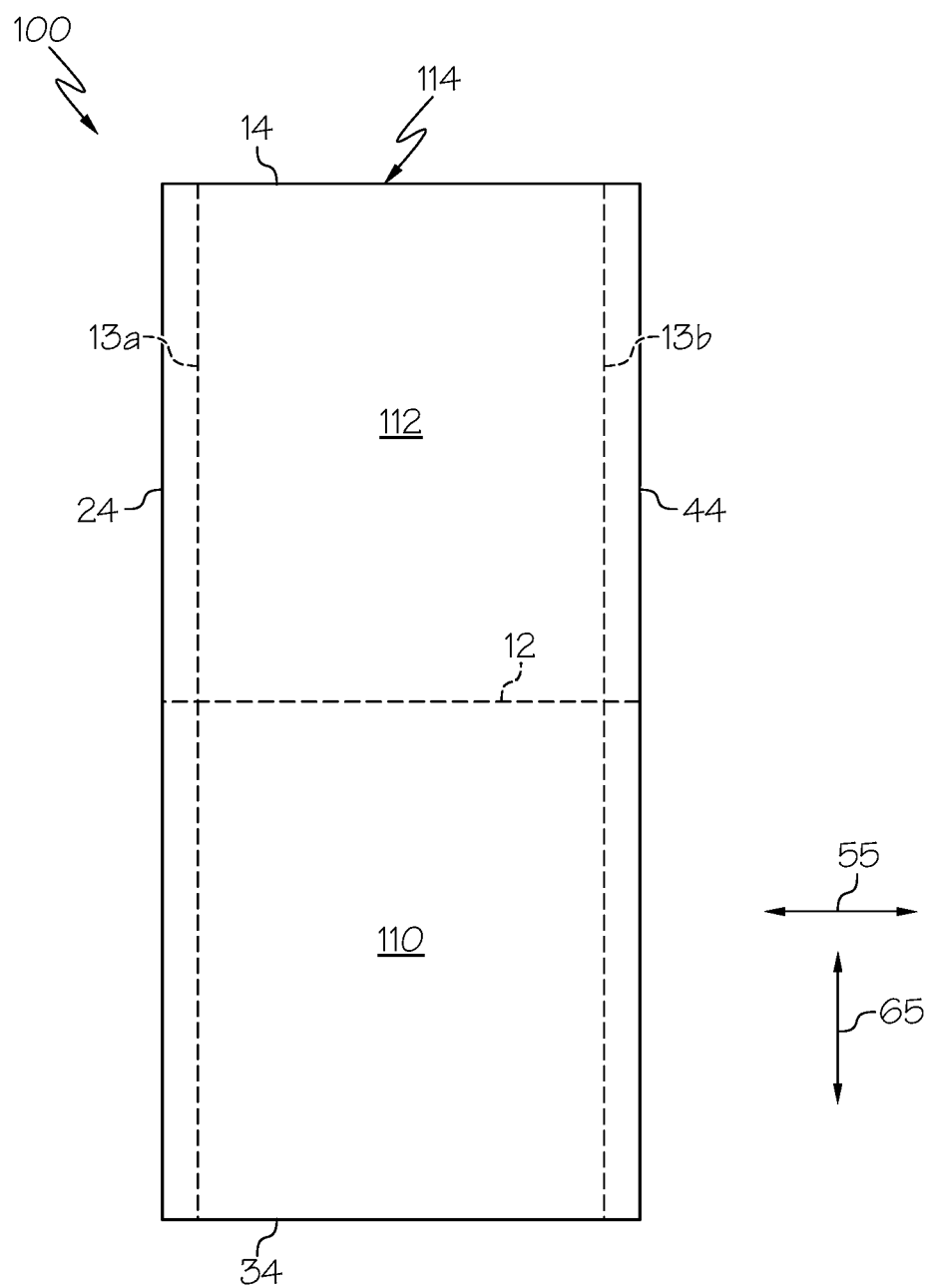
FIG. 1 is a plan view of an unassembled bag in accordance with an embodiment of the present invention.
Figure 2:
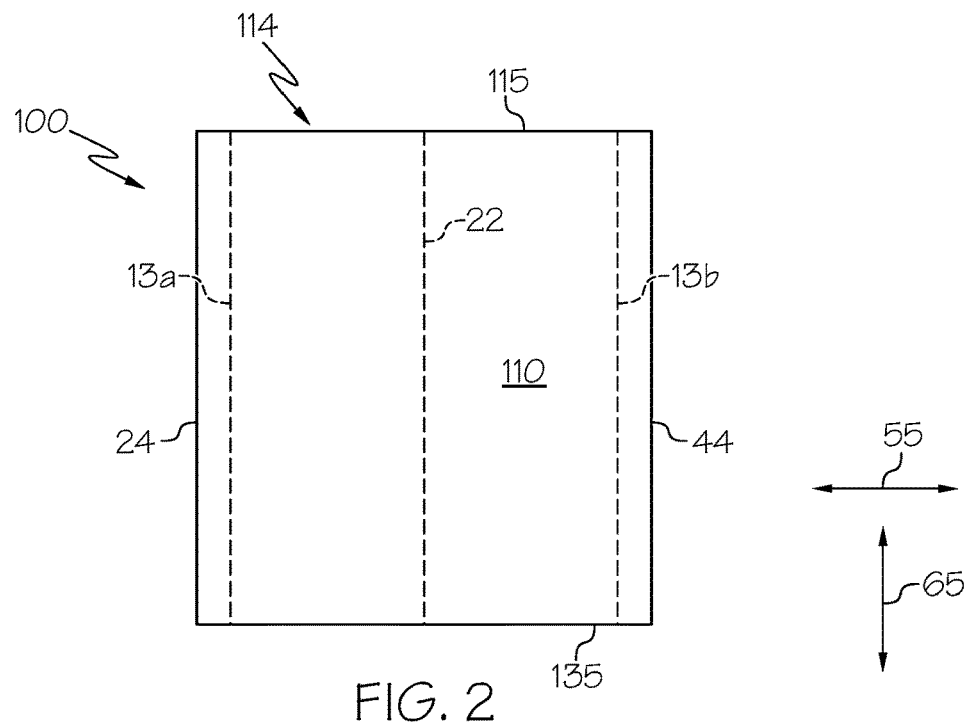
FIG. 2 is a plan view of a partially assembled bag in accordance with an embodiment of the present invention.
Figure 3:
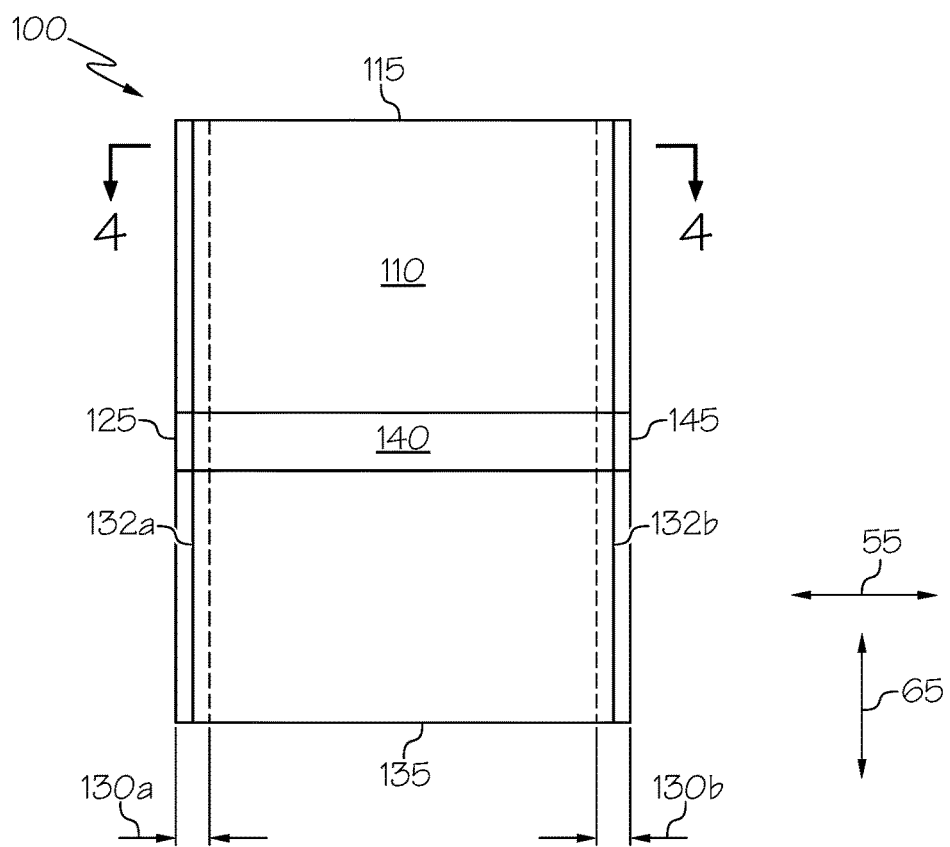
FIG. 3 is a plan view of an assembled bag with seam structures in accordance with an embodiment of the present invention.

FIGS. 1-4 illustrate a bag 100, in various stages of assembly, formed from an open mesh fabric in accordance with an embodiment of the present invention. As depicted in FIG. 1, bag 100 includes first section 110 and second section 112. First and second sections 110 and 112, respectively, collectively form fabric panel 114 from which bag 100 is formed by transitioning from the unfolded position depicted in FIG. 1 to the V-folded position depicted in FIG. 2 to the folded-seam position depicted in FIG. 3 (with FIG. 4 (not to scale) depicting bag 100 along line 4-4 of FIG. 3). In the embodiment depicted in FIGS. 1-4, fabric panel 114 is defined by a perimeter consisting of first, second, third, and fourth edges 14, 24, 34, and 44, respectively.

The open mesh fabric used to manufacture fabric panel 114 may be formed from polyolefins (including, for example and without limitation, polyethylene) or other suitable polymers, and more preferably from a cross-laminated nonwoven polyolefin fabric. For example, the open mesh fabric may be any such nonwoven fabric designated under the trademark CLAF® and available from JX Nippon ANCI, Inc., including, without limitation, CLAF S, CLAF SS, CLAF HS and CLAF MS CLAF® fabrics (see, e.g., www.claf.com/english/claf/properties/pdf/claf_grade.pdf). As another example, the open mesh fabric may be implemented using a cross-laminated nonwoven fabric made from coextruded film that has been split and stretched. In an embodiment, different open mesh fabrics may be used to implement first and second sections 110 and 112. In an embodiment, an open mesh fabric may include more than one layer.

Bag 100 includes a bottom, or butt end, 135 formed by folding fabric panel 114 in cross machine direction 65 along longitudinal central axis 12 intervening between second and fourth edges 24 and 44, respectively. This fold in fabric panel 114 along central axis 12 may be referred to as a "V" fold. Upon folding fabric panel 114 along central axis 12, first edge 14 of fabric panel 114 is brought into contact with third edge 34 of fabric panel 114. When in the V-folded position illustrated in FIG. 2, first and second sections 110 and 112, respectively, extend from the fold along central axis 12 and terminate at an opposing end 115 of bag 100. In this V-folded position, first and second sections 110 and 112, respectively, provide a front wall and a back wall of bag 100.

In an embodiment, bag 100 includes label panel 140 for incorporating printed or printable labels into the design of bag 100. In an embodiment, label panel 140 is positioned anywhere between butt end 135 to opposing end 115 on the front wall of bag 100 provided by first section 110. In an embodiment, label panel 140 is positioned anywhere between butt end 135 to opposing end 115 on the back wall of bag 100 provided by second section 112.

Label panel 140 may be manufactured from printable polymeric films available commercially, including, for example and without limitation, composites of low-density polyethylene blended with ethylene-vinyl acetate, linear low-density polyethylene or metallocene polyethylene to improve sealing. As another example, label panel 140 may be manufactured using a multi-layer film such as a high-density polyethylene/linear low-density poly-ethylene/blend coextruded. As another example, label panel 140 may be manufactured using a film comprising linear low-density polyethylene/polyester or from oriented polypropylene film coated with low or linear low-density polyethylene.

Bag 100 also includes seam structures 130a and 130b extending from bottom, or butt end, 135 to opposing end 115. In the embodiment depicted in FIGS. 1-4, seam structures 130a and 130b are each implemented by folding fabric panel 114 along lateral axes 13a and 13b, respectively, towards central lateral axis 22 to form "J" seams. Specifically, second edge 24 of fabric panel 114 is folded along lateral axis 13a towards central lateral axis 22 whereas fourth edge 44 of fabric panel 114 is folded along lateral axis 13b towards central lateral axis 22. Upon folding fabric panel 114 along lateral axis 13a, second edge 24 of fabric panel 114 is brought into contact with the back wall of bag 100 provided by second section 112. Similarly, upon folding fabric panel 114 along lateral axis 13b, fourth edge 44 of fabric panel 114 is also brought into contact with the back wall of bag 100 provided by second section 112.

One skilled in the art will recognize in view of the present disclosure that while seam structures 130a and 130b are each implemented using "J" seams in the embodiment depicted in FIGS. 1-4, other embodiments of the present invention are not so limited. Examples of suitable seam structures for implementing one or more of seam structures 130a and 130b are described in greater detail below with respect to FIGS. 5A-5F. Any combination of seam structures consistent with the present disclosure may be used to implement one or more of seam structures 130a and 130b.

Figure 4:
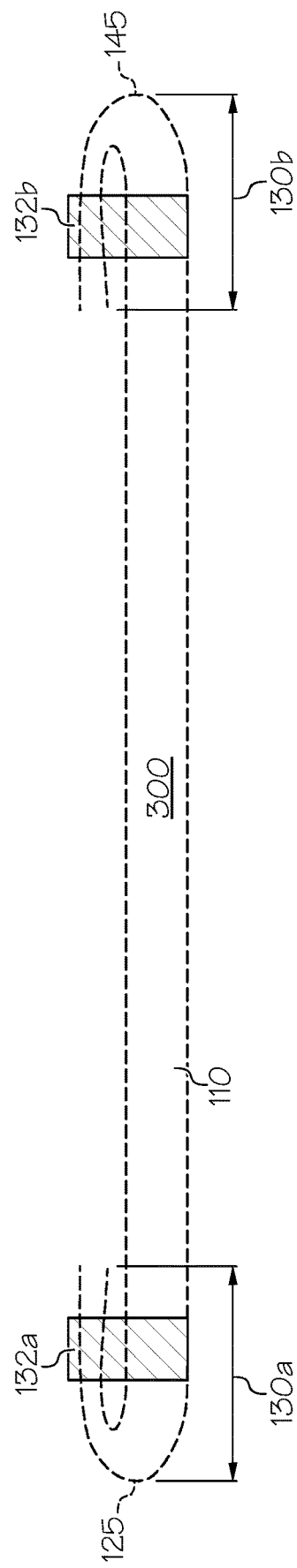
FIG. 4 is a cross-sectional exploded view taken along line 4-4 of FIG. 3, depicting an embodiment of a seam structure of the bag.

Subsequent to folding fabric panel 114 along lateral axes 13a and 13b towards central lateral axis 22, heat and/or pressure is applied to seam structures 130a and 130b in cross machine direction 65 from bottom, or butt end, 135 to opposing end 115. Applying the heat and/or pressure creates seals 132a and 132b in seam structures 130a and 130b, respectively, which thermally bond the various layers of fabric panel 114 present within the corresponding seam structure. In embodiments in which bag 100 includes label panel 140, seals 132a and 132b also thermally bond the various layers of label panel 140 present within seam structures 130a and 132b, respectively. Seals 132a and 132b together with butt end 135 and open end 115 define a perimeter of open mesh fabric that forms a space or volume 300 for receiving contents placed into bag 100, as shown in FIG. 4. Seam structures 130a and 130b do not require, and thus do not include, an adhesive material applied thereto for purposes of bonding the various layers of fabric panel 114 within seam structures 130a and 130b.

One skilled in the art will recognize in view of the present disclosure that widths of seals 132a and 132b will vary depending on different design parameters for bag 100, such as size, construction, and intended use. As described in greater detail below, seals 132a and 132b each include a plurality of seal portions that bond proximate layers of a fabric panel. At least one seal portion of the plurality of seal portions is a sacrificial seal that provides bag 100 with volumetric flexibility. In an embodiment, that volumetric flexibility is realized as an increase in volume 300 within bag 100 responsive to a sacrificial seal at least partially giving (or releasing or slackening) from an overall seam structure (e.g., seam structures 130a and/or 130b). In an embodiment, a width of seal 132a, a width of seal 132b, or a combination thereof is determined based on that resulting increase in volume 300 responsive to a sacrificial seal at least partially giving. In an embodiment, a location of seal 132a within seam structure 130a, a location of seal 132b within seam structure 130b, or a combination thereof is determined based on that resulting increase in volume 300 responsive to a sacrificial seal at least partially giving.

Those skilled in the art will also appreciate that the manner in which heat and/or pressure is applied will vary depending on various material properties associated with the open mesh fabric composing first and second sections 110 and 112, respectively. Likewise, the manner in which heat and/or pressure is applied will also vary depending on various material properties associated with label panel 140 when present. Examples of such variances in the manner in which heat and/or pressure is applied include a magnitude of heat and/or pressure associated with a sealing implement applying the heat and/or pressure, a dwell time, and the like.

Opposing end 115 may be either open or closed. In an embodiment, opposing end 115 is open before contents are placed in volume 300 within bag 100. In an embodiment, opposing end 115 is closed by a fastening means after contents are placed in volume 300. In an embodiment, opposing end 115 is closed before contents are placed within volume 300. In this embodiment, contents may be placed within volume 300 in machine direction 55 prior to implementing one or more of seam structures 130a and 130b. In an embodiment, opposing end 115 is supplemented with a fastening means. Examples of suitable fastening means for implementing aspects of the present invention include stitching, sewing, lacing, tying, stapling, adhesives, heat sealing, rib-and-groove elements, twist-type closures, and the like.

Figure 5A:
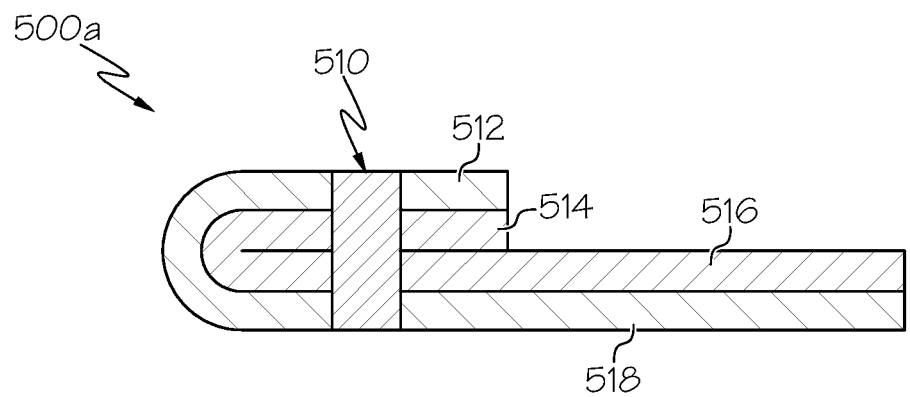
FIG. 5A depicts an example of a seam structure for implementing aspects of the present invention.
Figure 5B:
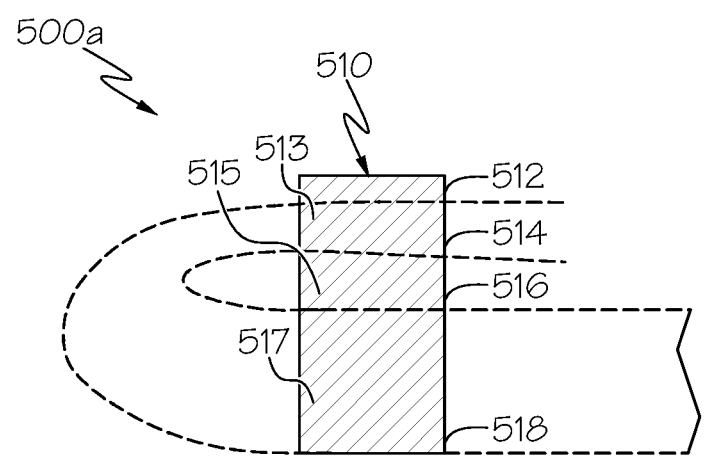
FIG. 5B depicts an exploded view of the seam structure depicted in FIG. 5A.
Figure 5C:
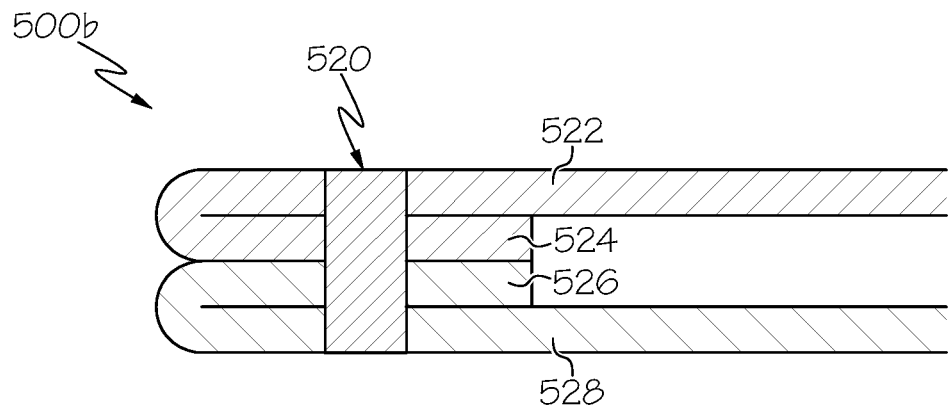
FIG. 5C depicts another example of a seam structure for implementing aspects of the present invention.
Figure 5D:
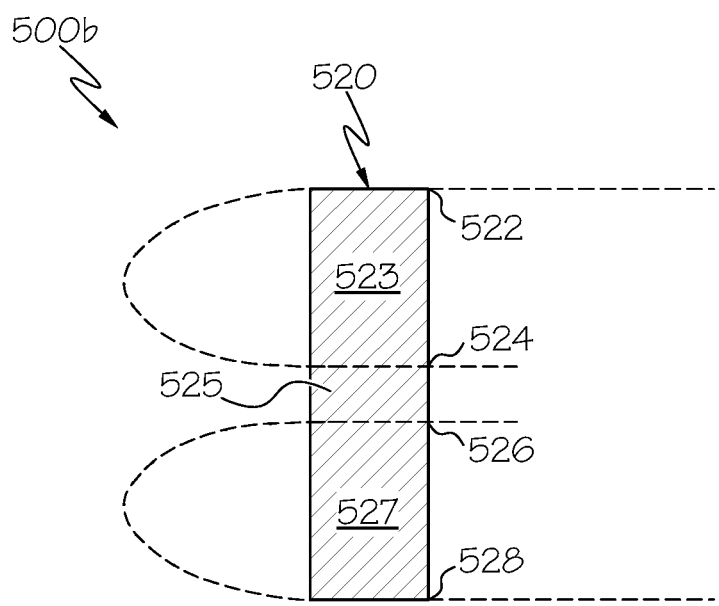
FIG. 5D depicts an exploded view of the seam structure depicted in FIG. 5C.
Figure 5E:
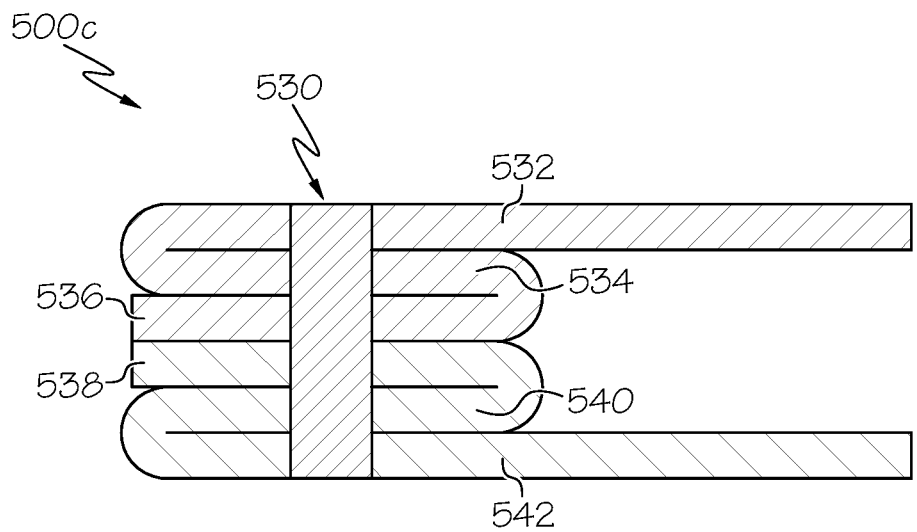
FIG. 5E depicts another example of a seam structure for implementing aspects of the present invention.
Figure 5F:
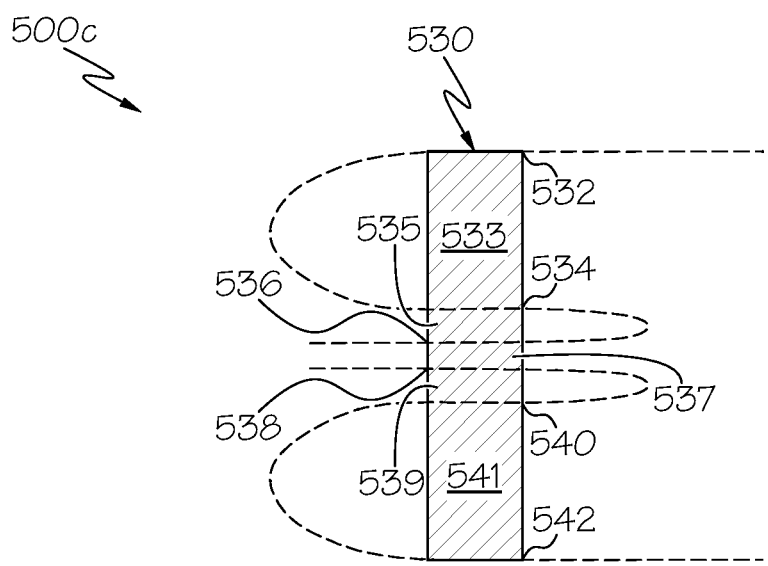
FIG. 5F depicts an exploded view of the seam structure depicted in FIG. 5E.

Turning to FIGS. 5A-5F, examples of suitable seam structures for implementing one or more of seam structures 130a and 130b are provided. FIG. 5A depicts a seam structure 500a implemented as a heat sealed "J" seam. FIG. 5B depicts an exploded view of seam structure 500a (not to scale) for illustrating several aspects of the present invention. FIG. 5C depicts a seam structure 500b implemented as a heat sealed inverse-butterfly seam. FIG. 5D depicts an exploded view of seam structure 500b (not to scale) for illustrating several aspects of the present invention. FIG. 5E depicts a seam structure 500c implemented as a heat sealed combination seam that includes an inverse-butterfly seam and a fin seam. FIG. 5F depicts an exploded view of seam structure 500c (not to scale) for illustrating several aspects of the present invention. Each of the examples depicted by FIGS. 5A-5F include a fabric panel comprising two sections of open mesh fabric represented by continuous dashed lines. In an embodiment, the fabric panel relates to fabric panel 114 of FIGS. 1-4. In an embodiment, the fabric panel includes a first section and a second section that relate to first and second sections 110 and 112, respectively, of FIGS. 1-4. In each example, the fabric panel has been folded in various configurations and heat sealed to create a seal, as indicated by the solid shading that joins proximate layers of the fabric panel. In an embodiment, such seals indicated by the solid shading relate to one or more of seals 132a and 132b.

As shown in FIG. 5A, seam structure 500a includes seal 510 and four layers of a folded fabric panel comprising a first section and a second section. By including four layers of the folded fabric panel within seam structure 500a, seam structure 500a is known as a multi-layer seam structure. The first section corresponds to layers 512 and 518. The second section corresponds to layers 514 and 516. Subsequent to folding the fabric panel in the configuration depicted in FIG. 5A, heat and/or pressure was applied to seam structure 500a to create seal 510, and thus bond layers 512, 514, 516 and 518 present within seam structure 500a. Seal 510 includes seal portion 513 that bonds layer 512 to layer 514, seal portion 515 that bonds layer 514 to layer 516, and seal portion 517 that bonds layer 516 to layer 518, each within seam structure 500a. Seam structure 500a does not require, and thus does not include, an adhesive material applied thereto for purposes of bonding layers 512, 514, 516 and 518 within seam structure 500a. In seam structure 500a, seal portion 517 is a "sacrificial seal".

As used herein, "sacrificial seal" refers to a seal portion of a seam structure that is configured to at least partially give (or release or slacken) from the overall seam structure, whilst one or more other seal portions of the seam structure remain intact. Specifically, when the sacrificial seal gives, the layer of open mesh fabric (formerly bonded within the seam structure) unbonds or delaminates from the seam structure; however, the other seal portions within the seam structure maintain bonds between adjacent layers of the open mesh fabric (see also FIGS. 6-7, and the associated description below, pertaining to seam strength testing). As it is no longer constrained by the sacrificial seal, the unbonded layer of open mesh fabric is free to move away from the remaining seam structure. The remaining seam structure itself, however, maintains the bag's structural integrity. This occurs because that unbonded layer is associated with a section of open mesh fabric that includes at least one other layer that remains bonded within the seam structure. Moreover, this unbonded layer, now released from the seam structure, provides the bag with additional volumetric "slack"; that is, the volume of the bag has increased commensurate with the total area of the unbonded layer (i.e., the area or portion of mesh fabric previously constrained by the sacrificial seal). As such, the sacrificial seal imbues the side-sealed bag of the present invention with volumetric flexibility, whilst the remaining seam structure provides an improved seam strength at a reduced cost relative to other manufacturing techniques (and which seam structure exhibits a strength comparable to the original strength of the stock material from which the bag is fabricated).

As shown by FIGS. 5C-D, seam structure 500b includes seal 520 and four layers of a folded fabric panel comprising a first section and a second section. Similar to seam structure 500a, by including four layers of the folded fabric panel within seam structure 500b, seam structure 500b is also known as a multi-layer seam structure. The first section of FIGS. 5C-D corresponds to layers 522 and 524. The second section of FIGS. 5C-D corresponds to layers 526 and 528. Subsequent to folding the fabric panel in the configuration depicted in FIGS. 5C-D, heat and/or pressure was applied to seam structure 500b to create seal 520. Seal 520 includes seal portion 523 that bonds layer 522 to layer 524, seal portion 525 that bonds layer 524 to layer 526, and seal portion 527 that bonds layer 526 to layer 528, each within seam structure 500b. Seam structure 500b does not require, and thus does not include, an adhesive material applied thereto for purposes of bonding layers 522, 524, 526 and 528 within seam structure 500b. In seam structure 500b, one or more of seal portions 523 and 527 is a sacrificial seal. In an embodiment, seal portion 523 is configured to have a lower seam strength than seal portion 527 and the other seal portions of seal 520. In an embodiment, seal portion 527 is configured to have a lower seam strength than seal portion 523 and the other seal portions of seal 520. In an embodiment, at least one seal portion is configured to have a lower seam strength relative to other seal portions by varying one or more aspects of the manner in which heat and/or pressure is applied when the seal is formed. Examples of such variances in the manner in which heat and/or pressure is applied include a magnitude of heat and/or pressure associated with a sealing implement applying the heat and/or pressure, a dwell time, and the like.

As shown by FIGS. 5E-F, seam structure 500c includes seal 530 and six layers of a folded fabric panel comprising a first section and a second section. Similar to seam structures 500a and 500b, by including six layers of the folded fabric panel within seam structure 500c, seam structure 500c is also known as a multi-layer seam structure. The first section of FIGS. 5E-F corresponds to layers 532, 534, and 536. The second section of FIGS. 5E-F corresponds to layers 538, 540, and 542. Subsequent to folding the fabric panel in the configuration depicted in FIGS. 5E-F, heat and/or pressure was applied to seam structure 500c to create seal 530. Seal 530 includes seal portion 533 that bonds layer 532 to layer 534, seal portion 535 that bonds layer 534 to layer 536, seal portion 537 that bonds layer 536 to layer 538, seal portion 539 that bonds layer 538 to layer 540, and seal portion 541 that bonds layer 540 to layer 542, each within seam structure 500c. Seam structure 500c does not require, and thus does not include, an adhesive material applied thereto for purposes of bonding layers 532, 534, 536, 538, 540 and 542 within seam structure 500c. In an embodiment, at least one seal portion among seal portions 533, 535, 539, and 541 is a sacrificial seal. In an embodiment, seal portions 533 and 541 are configured to have lower seam strengths than seal portions 535 and 539. In an embodiment, seal portions 535 and 539 are configured to have lower seam strengths than seal portions 533 and 541. In an embodiment, at least one seal portion is configured to have a lower seam strength relative to other seal portions by varying one or more aspects of the manner in which heat and/or pressure is applied when the seal is formed. Examples of such variances in the manner in which heat and/or pressure is applied include a magnitude of heat and/or pressure associated with a sealing implement applying the heat and/or pressure, a dwell time, and the like.

Figure 7:
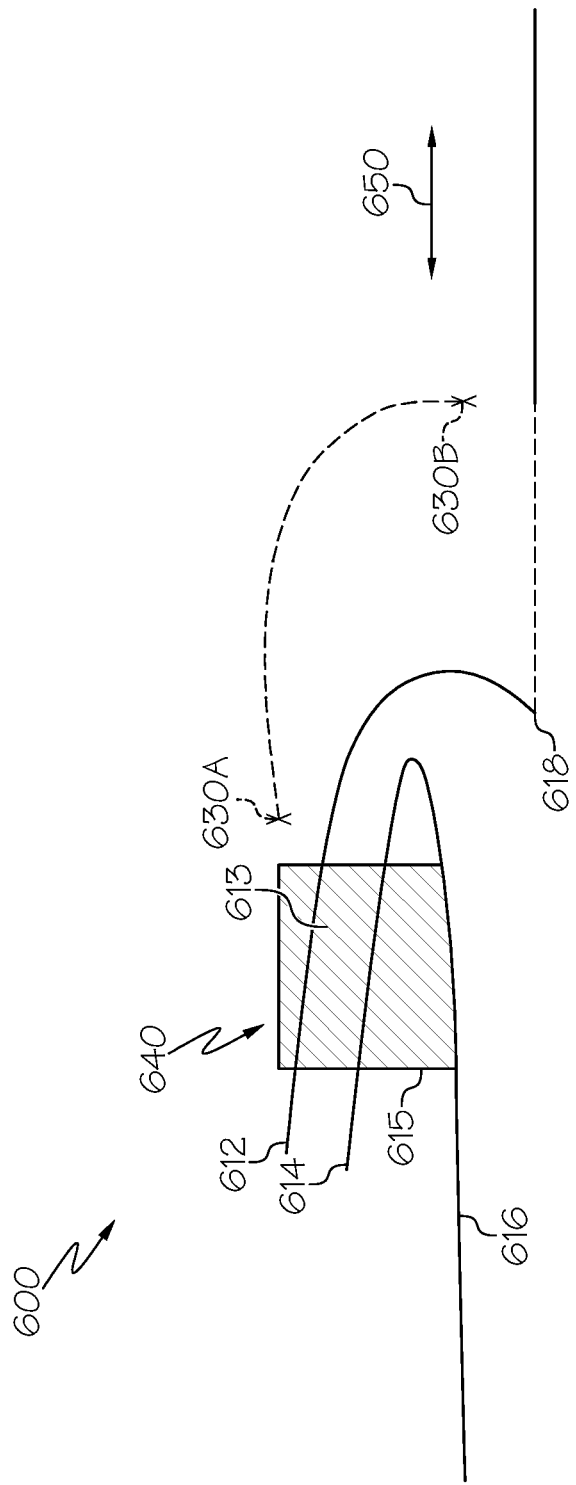
FIG. 7 depicts the seam structure of FIG. 6 following separation of a first layer during seam strength testing; and, FIG. 8 depicts another example of a seam structure for implementing aspects of the present invention.

An example of a sacrificial seal releasing during a seam strength test is illustrated in FIGS. 6 and 7. As shown in FIGS. 6-7, seam structure 600 includes seal 640 and four layers of a folded fabric panel comprising a first section and a second section. The first section of FIGS. 6-7 corresponds to layers 612 and 618. The second section of FIGS. 6-7 corresponds to layers 614 and 616. Seal 640 includes seal portion 613 that bonds layer 612 to layer 614, seal portion 615 that bonds layer 614 to layer 616, and seal portion 617 that bonds layer 616 to layer 618, each within seam structure 600. Seam structure 600 does not require, and thus does not include, an adhesive material applied thereto for purposes of bonding layers 612, 614, 616 and 618 within seam structure 600. In this example, seal portion 617 of seam structure 600 is a sacrificial seal and a force is applied to seam structure 600 in seam strength test direction 650 during the seam strength testing.

FIG. 6 depicts seam structure 600 prior to seam strength testing. FIG. 7 depicts seam structure 600 after seal portion 617 gives during the seam strength testing. As shown by FIGS. 6 and 7, when seal portion 617 gives or slackens, layer 618 of seam structure 600 separates from the remaining layers (i.e., layers 612, 614, and 616). Upon separating from the remaining layers, an additional portion between point 630A and point 630B of layer 618 is free to expand (thus commensurately increasing the volumetric capacity of the bag). As previously described with respect to FIGS. 1-4, a width of seal 640, a location of seal 640 within seam structure 600, or a combination thereof determines the increase in the volumetric capacity of the bag. For example, a different volumetric capacity increase can be realized when a width of seal 640 is increased or decreased than is possible when the width remains unchanged. As another example, a different volumetric capacity increase can be realized when seal 640 is centrally located within seam structure 600 than is realized when the location of seal 640 is moved from that central location in a direction that is orthogonal to seam strength test direction 650.

Moreover, after seal portion 617 gives, the remaining seal portions (i.e., seal portions 613 and 615) continue to bond those remaining layers of seam structure 600. Among those layers that remain bonded within seam structure 600 is layer 612, which corresponds to the same section of the fabric panel (i.e., the first section) as unbonded layer 618. Consequently, even though seal portion 617 gave, seam structure 640 is able to maintain the structural integrity of the bag.

Seam structure 600 may also be described as comprising a flat seam structure defined by layer 616, seal portion 617 and layer 618, and an overlap seam structure defined by layer 612, seal portion 613, layer 614, seal portion 615 and layer 616. As shown by FIGS. 6 and 7, when seal portion 617 (the sacrificial seal) gives or slackens, the flat seam structure unbonds (i.e., layer 618 separates from layer 616), leaving the overlap seam structure intact (i.e., layers 612, 614 and 616 remain bonded within seam structure 600 via seal portions 613 and 615). Thus, the unbonded flat seam structure provides the bag with additional volumetric "slack", whilst the overlap seam structure maintains the structural integrity of the bag.

Figure 8:
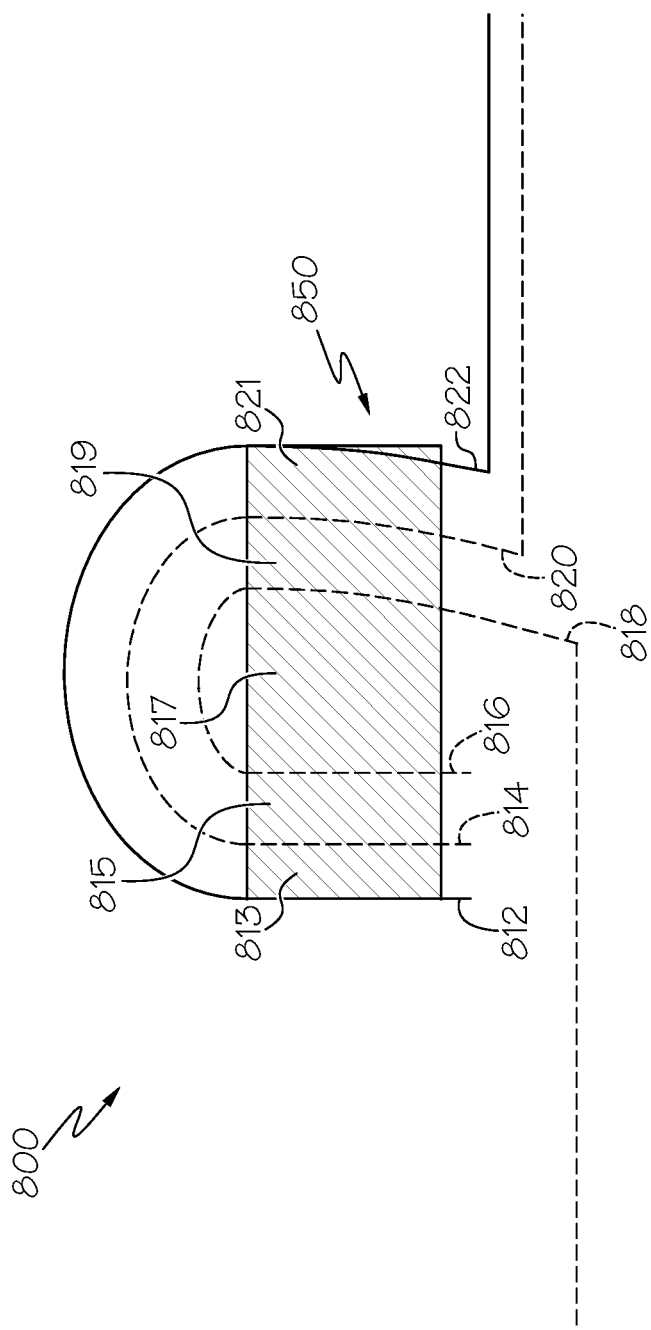

FIG. 8 depicts seam structure 800. As shown in FIG. 8, seam structure 800 includes seal 850, two layers of a folded label panel corresponding to layers 812 and 822, and four layers of a folded fabric panel comprising a first section and a second section. The first section corresponds to layers 814 and 820. The second section corresponds to layers 816 and 818. Subsequent to folding the fabric and label panels in the configuration depicted in FIG. 8, heat and/or pressure was applied to seam structure 800 to create seal 850. Seal 850 includes seal portion 813 that bonds layer 812 to layer 814, seal portion 815 that bonds layer 814 to layer 816, seal portion 817 that bonds layer 816 to layer 818, seal portion 819 that bonds layer 818 to layer 820, and seal portion 821 that bonds layer 820 to layer 822, each within seam structure 800. Seam structure 800 does not require, and thus does not include, an adhesive material applied thereto for purposes of bonding layers 812, 814, 816, 818, 820 and 822 within seam structure 800. In an embodiment, at least one seal portion among seal portions 819 and 821 is a sacrificial seal.

It should be noted that the various seam structures described herein may be formed simultaneously (e.g., by sealing only after all layers of fabric within the particular seam structure have been arranged or folded to achieve a seam structure depicted in any one or more of the embodiments described herein) or sequentially (e.g., by sealing, at intervals, after one or more layers of fabric within the particular seam structure has/have been arranged or folded to ultimately achieve a seam structure depicted in any one or more of the embodiments described herein). For example, with reference to seam structure 600 of FIG. 6 (which depicts a "J-folded" seam structure), the flat seam structure and overlap seam structure could be formed simultaneously, wherein all layers of fabric intended to form seam structure 600 are first J-folded and then sealed therethrough; or, flat seam structure and overlap seam structure could be formed sequentially, wherein all layers of fabric intended to form the flat seam structure could be sealed first (i.e., prior to J-folding) and, thereafter, all layers of fabric intended to form the overlap seam structure could J-folded together with the (now sealed) flat seam structure and the entirety of that J-folded structure could then be sealed to form seam structure 600.

The present invention contemplates a method of manufacturing a bag, comprising the steps of: providing a fabric panel comprising an open mesh fabric, wherein the fabric panel comprises a first section and a second section; folding the fabric panel along a longitudinal central axis between the first and second sections thereof to form a closed butt end and an open end opposing the closed butt end; folding a first edge of the fabric panel intervening between the closed butt end and the open end towards a lateral central axis to form a seam structure; and applying heat and/or pressure to at least a portion of the seam structure to create a seal that bonds a plurality of layers of the open mesh fabric within the seam structure. In the foregoing method, the seal formed thereby comprises a plurality of seal portions, at least one of which is a sacrificial seal. The sacrificial seal is at least partially releasable from one or more of the other seal portions of the seal in the seam structure. The structural integrity of the bag is maintained by the one or more other seal portions that remain intact after the sacrificial seal at least partially gives or releases. When the sacrificial seal at least partially gives or releases, at least one layer of the plurality of layers of the fabric panel unbonds or delaminates from the seam structure, thereby providing the bag, which comprised a first volume prior to the sacrificial seal at least partially giving or releasing, with a second volume subsequent to the sacrificial seal at least partially giving or releasing, and which second volume is greater than the first volume. The volumetric difference between the first and second volumes of the bag may be defined, in part, by the width of the sacrificial seal or at least the portion thereof that partially gave or released. In the foregoing method, application of adhesive materials are not required to form the seam structures of the bag, and, as such, the seam structures thereof lack such adhesive materials.

A 2-inch tensile test was conducted in accordance with the test procedures set out in American Society for Testing and Materials ("ASTM") D882. The 2-inch tensile test measured a seam strength associated with three seam structures by cutting five 2-inch wide samples of bags, each comprising one of the three seam structures perpendicular to a corresponding seam structure's heat seal. Two of the three seam structures, corresponding to Sample IDs TS9-50-A (unstretched) and TS9-50-A (pre-stretched), were implemented in accordance with embodiments of the present invention. Here, "unstretched" indicates that the samples include sacrificial seals that were still bonding adjacent layers at the onset of testing, whereas "pre-stretched" indicates that the samples include sacrificial seals that gave allowing an adjacent layer to delaminate prior to the onset of testing. Bags associated with Sample IDs TS9-50-A (unstretched) and TS9-50-A (pre-stretched) were fabricated using a 24-inch wide section of red-pigmented, 31 gsm CLAF fabric as the open mesh fabric. A first layer of each seam structure corresponding to Sample ID TS9-50-A (pre-stretched) was delaminated before testing (i.e., a corresponding sacrificial seal was released prior to the onset of testing). The remaining seam structure of the three seam structures, corresponding to Sample ID TS9-53-F, was a control seam structure implemented using an adhesive film strip. Bags associated with Sample ID TS9-53-F were fabricated using a 24-inch wide section of yellow-pigmented, 31 gsm CLAF fabric as the open mesh fabric and a 50 micron thick strip of Dow Affinity PF 1140 was used as the adhesive film strip.

Each bag's open mesh fabric was folded to create 0.75 inch wide "J" seams. The red-pigmented, 31 gsm CLAF fabric used in fabricating the bags associated with Sample IDs TS9-50-A (unstretched) and TS9-50-A (pre-stretched) included a machine direction strand side and a cross direction strand side. Folding that red-pigmented, 31 gsm CLAF fabric to create the "J" seam resulted in the machine direction strand side facing the interior of the resulting bag. Each "J" seam was heat sealed using a 0.5-inch wide aluminum seal bar (at the temperatures referenced in Table 1) over a 200° F. silicone rubber pad (for the dwell times referenced in Table 1). Results of the 2-inch tensile test for each sample are presented in Table 1. The results demonstrate that a seam strength of the samples implemented in accordance with the present invention (i.e., associated with Sample IDs TS9-50-A (unstretched) and TS9-50-A (pre-stretched)) is substantially higher than a seam strength of the samples implemented using the adhesive film strip (i.e., associated with Sample ID TS9-53-F). For example, Table 1 shows that the samples associated with Sample IDs TS9-50-A (unstretched) realized an approximate 253.40% increase in average seam strength relative to the samples associated with Sample ID TS9-53-F. Table 1 also shows that the samples associated with Sample IDs TS9-50-A (pre-stretched) realized an approximate 251.46% increase in average seam strength relative to the samples associated with Sample ID TS9-53-F.

TABLE 1

| Sample ID | CLAF Fabric | Notes | 1 (lbs) | 2 (lbs) | 3 (lbs) | 4 (lbs) | 5 (lbs) | avg. (lbs) | dwell time (sec.) | Temp (° F.) |
|---|---|---|---|---|---|---|---|---|---|---|
| TS9-50-A | 31 gsm (color: red) | unstretched | 35.4 | 35.6 | 37.0 | 35.9 | 38.2 | 36.4 | 2 × 0.5 | 300 |
| TS9-50-A | 31 gsm (color: red) | pre-stretched | 39.1 | 37.5 | 36.0 | 34.1 | 34.3 | 36.2 | 2 × 0.5 | 300 |
| TS9-53-F | 31 gsm (color: yellow) | 2 mil PF 1140 | 7.8 | 10.8 | 10.5 | 9.3 | 13.2 | 10.3 | 2 × 0.45 | 320 |

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed:

1. A bag comprising:
an open mesh fabric;
a front wall and a back wall at least partially formed from said open mesh fabric;
a plurality of seam structures;
at least one seam structure of said plurality of seam structures comprising a plurality of layers of said open mesh fabric and at least one seal that bonds said plurality of layers of said open mesh fabric within said at least one seam structure to thereby define at least one flat seam structure and at least one overlap seam structure within said at least one seam structure, said at least one seal comprising a plurality of seal portions, said plurality of seal portions comprising a sacrificial seal disposed within said at least one flat seam structure, said sacrificial seal at least partially releasable from said at least one flat seam structure to thereby at least partially release said at least one flat seam structure from said at least one seam structure; and
wherein said at least one seam structure does not comprise an adhesive material applied thereto for purposes of bonding said plurality of layers of said open mesh fabric within said at least one seam structure.

2. The bag of claim 1, wherein a structural integrity of said bag is maintained by said at least one overlap seam structure after said at least one sacrificial seal of said at least one flat seam structure at least partially releases.

3. The bag of claim 1, wherein said bag has a first volume before said at least one sacrificial seal at least partially releases and a second volume after said at least one sacrificial seal at least partially releases, wherein said second volume is greater than said first volume.

4. The bag of claim 3, wherein a volumetric increase defined by a difference between said first volume and said second volume is commensurate with a total area of an unbonded layer released from said at least one flat seam structure after said at least one sacrificial seal at least partially releases, said unbonded layer being one of said plurality of layers of said open mesh fabric.

5. The bag of claim 1, wherein said at least one flat seam structure has a lower seam strength than said at least one overlap seam structure.

6. The bag of claim 1, further comprising a label panel, wherein said at least one seam structure comprises at least a portion of said label panel.

* * * * *